(12) United States Patent
Lee

(10) Patent No.: US 11,376,816 B2
(45) Date of Patent: Jul. 5, 2022

(54) MANUFACTURING METHOD OF LIQUID CRYSTAL POLYMER FILM AND FLEXIBLE COPPER CLAD LAMINATE HAVING LIQUID CRYSTAL POLYMER FILM

(71) Applicant: AZOTEK CO., LTD., Taoyuan (TW)

(72) Inventor: Hung-Jung Lee, Taoyuan (TW)

(73) Assignee: AZOTEK CO., LTD., Taoyuan (TW)

( * ) Notice: Subject to any disclaimer, the term of this patent is extended or adjusted under 35 U.S.C. 154(b) by 431 days.

(21) Appl. No.: 16/228,775

(22) Filed: Dec. 21, 2018

(65) Prior Publication Data
US 2019/0240957 A1  Aug. 8, 2019

(30) Foreign Application Priority Data

Feb. 6, 2018  (TW) .................................. 107104196

(51) Int. Cl.
*B32B 15/09* (2006.01)
*C08J 5/18* (2006.01)
*C09K 19/38* (2006.01)

(52) U.S. Cl.
CPC ............ *B32B 15/09* (2013.01); *C08J 5/18* (2013.01); *C09K 19/3809* (2013.01); *B32B 2307/20* (2013.01); *B32B 2311/12* (2013.01); *B32B 2367/00* (2013.01); *B32B 2457/16* (2013.01); *C08J 2367/02* (2013.01); *C08J 2367/04* (2013.01)

(58) Field of Classification Search
CPC .................................. B32B 15/09; C08J 5/20
See application file for complete search history.

(56) References Cited

U.S. PATENT DOCUMENTS

| 4,394,498 A | 7/1983 | Kastelic |
| 2009/0229750 A1* | 9/2009 | Ito ........................ H05K 1/0313 |
| | | 156/322 |
| 2014/0106147 A1 | 4/2014 | Lee et al. |

FOREIGN PATENT DOCUMENTS

| CN | 1232860 A | 10/1999 |
| CN | 101534606 A | 9/2009 |
| CN | 102774079 A | 11/2012 |
| JP | 2012033869 A | 2/2012 |
| JP | 2013216085 A | 10/2013 |
| KR | 1020130105403 A | 9/2013 |
| TW | 200621468 | 7/2006 |
| TW | 201008423 | 2/2010 |
| WO | 2014/109199 A1 | 7/2014 |
| WO | 2017/061423 A1 | 4/2017 |

OTHER PUBLICATIONS

Zhi-Jun Chen et al., Modern Analysis Technology—Application in Polymer Study, Published and Distributed by Chengdu University of Technology Publishing, Edition 1, pp. 40-41, Aug. 1998.

* cited by examiner

*Primary Examiner* — Peter F Godenschwager
(74) *Attorney, Agent, or Firm* — CKC & Partners Co., LLC

(57) ABSTRACT

A method of manufacturing a liquid crystal polymer film, which includes the following operations: providing a liquid crystal polymer powder; uniformly dispersing the liquid crystal polymer powder in a solvent to form a mixed solution; coating the mixed solution on a carrier board to form a coating layer; heating the coating layer to a first temperature to remove the solvent in the coating layer; heating the liquid crystal polymer powder to a second temperature after the solvent is removed to form the liquid crystal polymer film.

9 Claims, 2 Drawing Sheets

MANUFACTURING METHOD OF LIQUID CRYSTAL POLYMER FILM AND FLEXIBLE COPPER CLAD LAMINATE HAVING LIQUID CRYSTAL POLYMER FILM

CROSS-REFERENCE TO RELATED APPLICATION

This application claims priority to Taiwan Application Serial Number 107104196, filed Feb. 6, 2018, which is herein incorporated by reference in its entirety.

BACKGROUND

Field of Invention

The present invention relates to methods of manufacturing liquid crystal polymer films and methods of manufacturing flexible copper clad laminates having the liquid crystal polymer films.

Description of Related Art

Central processing units (CPUs) used for current mobile devices, such as, for example, smart phones, tablet computers, and laptops, generally have a clock rate of the order of gigahertz and above. Therefore, it is necessary to use high frequency circuits in the current mobile devices to cooperate with the CPUs having the gigahertz clock rate. To satisfy the requirements of the high frequency circuits, there is a need to reduce the adverse effects caused by RC delay in the current mobile devices.

Liquid crystal polymer (LCP) film, which serves as dielectric materials, have very stable physical properties such as dielectric constant or dielectric loss tangent in high frequency regions and also low water absorption, and therefore can be used in high-frequency circuit substrates or circuits for high-speed cables. However, besides fluorinating reagents, current commercially available liquid crystal polymers are not soluble in common organic solvents. Therefore, industrially, the liquid crystal polymer films are produced by melting of the polymers followed by, for example, Injection molding, extrusion molding, inflation molding, or blow molding. Nevertheless, because of specific orientations in arrangement of the LCP molecules, the molecular arrangement of the LCP films formed by the above-mentioned method may have a high orientational order, and thus the LCP films are prone to peeling or cracking under external stresses.

SUMMARY

The present invention provides a method of manufacturing a liquid crystal polymer film. The method includes the following operations: first, providing a liquid crystal polymer powder; uniformly dispersing the liquid crystal polymer powder in a solvent to form a mixed solution; coating the mixed solution on a carrier board to form a coating layer; heating the coating layer to a first temperature to remove the solvent in the coating layer; and heating the liquid crystal polymer powder to a second temperature after removing the solvent to form the liquid crystal polymer film.

According to an embodiment of the invention, the operation of uniformly dispersing the liquid crystal polymer powder in a solvent further includes adding a dispersant, an additive, or a combination thereof into the mixed solution.

According to an embodiment of the invention, the second temperature is at least higher than a liquid crystal transition temperature of the liquid crystal polymer powder.

According to an embodiment of the invention, the second temperature is higher than the first temperature.

According to an embodiment of the invention, an average particle size of the liquid crystal polymer powder ranges from 1 nm to 1,000 μm.

According to an embodiment of the invention, a thickness of the liquid crystal polymer film ranges from 1 μm to 2,000 μm.

In another aspect of the present invention, a method of manufacturing a flexible copper clad laminate having a liquid crystal polymer film is provided. The manufacturing method includes the following operations: first, providing a liquid crystal polymer powder; uniformly dispersing the liquid crystal polymer powder in a solvent to form a mixed solution; coating the mixed solution on a first copper clad to form a coating layer; heating the coating layer to a first temperature to remove the solvent in the coating layer; and heating the liquid crystal polymer powder to a second temperature after removing the solvent to form the liquid crystal polymer film on the first copper clad.

According to an embodiment of the invention, the second temperature is at least higher than a liquid crystal transition temperature of the liquid crystal polymer powder.

According to an embodiment of the invention, the second temperature is higher than the first temperature.

According to an embodiment of the invention, after the operation of forming the liquid crystal polymer film, the method further includes heating the flexible copper clad laminate to a third temperature and attaching a second copper clad on the liquid crystal polymer film, such that the liquid crystal polymer film is disposed between the first copper clad and the second copper clad.

According to an embodiment of the invention, the third temperature is between a glass transition temperature ($T_g$) and a melting point ($T_m$) of the liquid crystal polymer powder.

According to an embodiment of the invention, an average particle size of the liquid crystal polymer powder ranges from 1 nm to 1,000 μm.

According to an embodiment of the invention, a thickness of the liquid crystal polymer film ranges from 1 μm to 2,000 μm.

BRIEF DESCRIPTION OF THE DRAWINGS

The above and other aspects, purposes, features and advantages of the invention will be better understood by reading the following more particular description of the invention in conjunction with the accompanying drawings. The detailed description of the drawings is as below.

DETAILED DESCRIPTION

As used herein, the singular forms "a," "an" and "the" throughout the specification include plural referents unless the context clearly dictates otherwise. Reference throughout the specification to "an embodiment" means that a particular feature, structure, or characteristic described in connection with the embodiments is included in at least one embodiment of the present invention. Thus, uses of the phrases "in an embodiment" in various places throughout the specification are not necessarily all referring to the same embodiment. Furthermore, the particular features, structures, or characteristics may be combined in any suitable manner in one or more embodiments.

In the following detailed description, numerous specific details are described in details to provide a thorough understanding of the disclosed embodiments. It will be apparent, however, that one or more embodiments may be practiced without these specific details.

Figure 1:
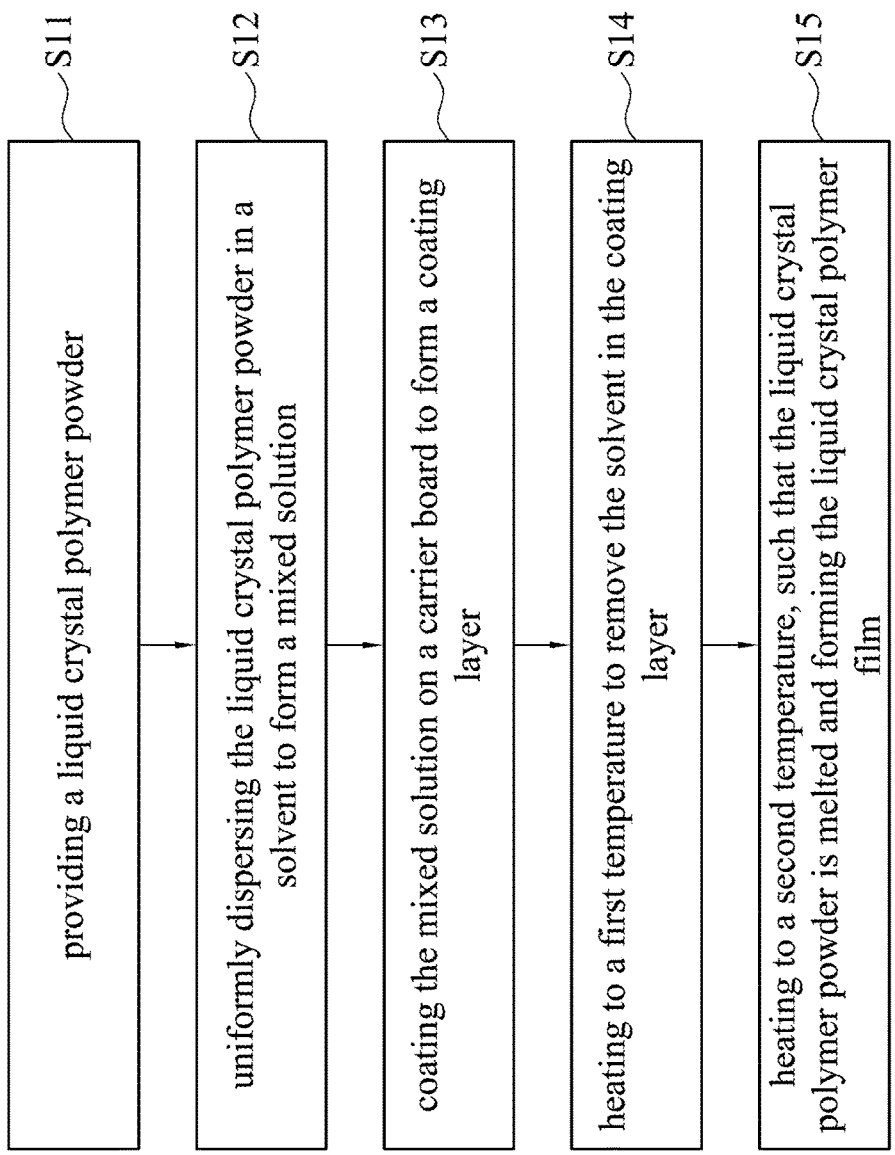
FIG. 1 illustrates a flow chart of a method of manufacturing a liquid crystal polymer film in accordance with an embodiment of the invention.

One aspect of the present invention is to provide a method of manufacturing a liquid crystal polymer film. Compared with a conventional dielectric layer, the liquid crystal polymer film produced by this method has some advantages, such as owning lower water absorption, dielectric constant, dissipation factor and coefficient of thermal expansion (CTE), as well as superior dimensional stability, electrical properties, gas barrier properties, thermal conductivity, and the like. FIG. 1 illustrates a flow chart of a method 10 of manufacturing a liquid crystal polymer film in accordance with an embodiment of the invention. As shown in FIG. 1, the method 10 includes steps S11 to S15.

First, at step S11, a liquid crystal polymer powder is provided. In some examples, the liquid crystal polymer powder may be prepared by grinding a liquid crystal polymer, but is not limited thereto. In some embodiments, an average particle size of the liquid crystal polymer powder may range from 1 nm to 1,000 µm, such as 5 nm, 10 nm, 15 nm, 20 nm, 30 nm, 50 nm, 70 nm, 90 nm, 100 nm, 1 µm, 5 µm, 10 µm, 15 µm, 20 µm, 50 µm, 100 µm, 200 µm, 300 µm, 400 µm, 500 µm, 600 µm, 700 µm, 800 µm, or 900 µm. It is noted that the liquid crystal polymer in the present invention is a thermotropic liquid crystal polymer resin. The thermotropic liquid crystal polymer may be classified into a liquid crystal polymer resin or a liquid crystal oligomer resin depending on their molecular weights. In some embodiments, the liquid crystal polymer powder may be formed by grinding the liquid crystal polymer resins and/or the liquid crystal oligomer resins. In some embodiments, a commercially available liquid crystal polymer includes: 1. Type I liquid crystal polymer resin, which has high thermal resistance and a liquid crystal transition temperature greater than about 330° C. Type I liquid crystal polymer resin has a high tensile strength, a high elastic modulus, an excellent chemical resistance, suitable to be used under a high temperature, but the processability is inferior. 2. Type II liquid crystal polymer resin, which has medium thermal resistance and a liquid crystal transition temperature of about 280° C. to about 320° C. Type II liquid crystal polymer resin is chemical-resistant and hydrolytic-stable, exhibits excellent electrical properties, flame retardancy, strong barrier properties, and its overall performance is better. 3. Type III liquid crystal polymer resin, which has low thermal resistance and a liquid crystal transition temperature lower than about 240° C. Type III liquid crystal polymer resin, though having a low heat resistance, has excellent processability and is low-cost.

It is noted that the liquid crystal transition temperature is a certain temperature at which the thermotropic liquid crystal polymer resin undergoes a phase transition from a solid state to a liquid crystal state upon heating. It is understood that different types of the thermotropic liquid crystal polymer resins may have different liquid crystal transition temperatures as their monomer structures are different.

In an example, the high-thermal-resistance type liquid crystal polymer resin includes a liquid crystal polymer resin consisting of p-hydroxybenzoic acid (HBA), terephthalic acid (TA), and 4,4'-dioxydiphenol (DODP). For example, a commercially available liquid crystal polymer (Xydar®) has a repeating unit of:

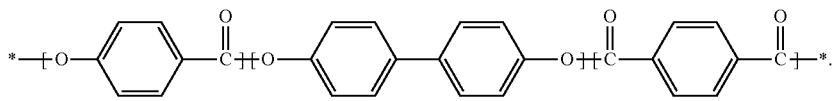

In another example, the medium-thermal-resistance type liquid crystal polymer resin includes a liquid crystal polymer resin consisting of p-hydroxybenzoic acid (HBA) and 6-hydroxy-2-naphthoic acid (HNA). For example, a commercially available liquid crystal polymer (Vectra®) has a repeating unit of:

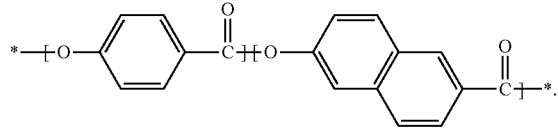

In yet another example, the low-thermal-resistance type liquid crystal polymer resin includes a liquid crystal polymer resin consisting of polyethylene terephthalate (PET) and p-hydroxybenzoic acid (HBA). For example, a commercially available liquid crystal polymer ($X_7G$®) has a repeating unit of:

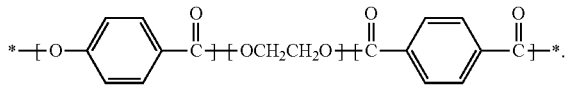

Next, at step S12, the liquid crystal polymer powder is uniformly dispersed in a solvent to form a mixed solution. In some embodiments, a ratio of the liquid crystal polymer powder to the solvent (the liquid crystal polymer powder/the solvent) may range from 1/100 to 90/100, such as 10/100 to 80/100, 20/100 to 70/100, 30/100 to 60/100, or 40/100 to 50/100. It is noted that the liquid crystal polymer powder is insoluble or slightly soluble in the solvent. The liquid crystal polymer powder is well dispersed in the solvent due to their inherent properties. Specifically, the liquid crystal polymer powder is dispersed in the solvent to form a suspension and is not precipitated from the suspension. In some embodiments, the solvent may include a polar solvent or a non-polar solvent. The solvent may be, for example, an amide solvent, an acid solvent, an alcohol solvent, a ketone solvent, an aromatic solvent, or water.

In an example, the amide solvent includes N,N-dimethylacetamide (DMAC), hexamethylphosphoramide (HMPA), N-methylpyrrolidone (NMP), N,N,N',N'-tetramethylurea, N-methylcaprolactam, N-acetylpyrrolidone, N,N-dimethylpropionamide, N-methylpiperidone, 1,3-dimethylimidazolidinone, N,N,N',N'-tetramethylmalonamide, and dimethylformamide (DMF), but is not limited thereto.

In another example, the acid solvent includes sulfuric acid, hydrofluoric acid, trifluoromethanesulphonic acid, trifluoroacetic acid (TFA), a mixed solution of TFA and methylene chloride (TFA/methylene chloride), a mixed solution of TFA, methylene chloride and perchloroethylene (TFA/methylene chloride/perchloroethylene), and chlorosulphonic acid, but is not limited thereto.

In yet another embodiment, the ketone solvent includes cyclohexanone and methyl ethyl ketone (MEK), but is not limited thereto.

In yet another example, the aromatic solvent includes methylbenzene, dimethylbenzene, p-chlorophenol, a mixed solution of p-chlorophenol and tetrachloroethane (p-chlorophenol/tetrachloroethane), a mixed solution of o-dichlorobenzene and p-chlorophenol o-dichlorobenzene/p-chlorophenol), a mixed solution of phenol, tetrachloroethane, and p-chlorophenol (phenol/tetrachloroethane/p-chlorophenol), a mixed solution of phenol and tetrachloroethane (phenol/tetrachloroethane), a mixed solution of phenol and chloroform (phenol/chloroform), m-cresol, o-chlorophenol, pentafluorophenol, and p-fluorophenol, but is not limited thereto.

In yet another example, the alcohol solvent includes hexafluoroisopropanol, but is not limited thereto.

In other examples, the solvent may include 1,3-dichloro-1,1,3,3-tetrafluoroacetone hydrate (DCTFAH), a mixed solution of DCTFAH and perchloroethylene (DCTFAH/perchloroethylene), tetrachloroethane, and dioxane, but is not limited thereto.

In some other embodiments, different additives may be optionally added to the mixed solution to modify a liquid crystal polymer film subsequently formed, such that the liquid crystal polymer film may possess some certain properties, and thereby meeting the requirements of applicable products. In some examples, the additives may be a stabilizer, a lubricant, a filler, a colorant, a curing agent, a plasticizer, and/or an antioxidant, but are not limited thereto. In one example, a surface-treated polytetrafluoroethylene (PTFE) may be added as an additive to enhance the electrical properties of the subsequently formed liquid crystal polymer film, and also to decrease the dielectric constant $(D_k)$ and dissipation factor $(D_f)$ of the subsequently formed liquid crystal polymer film.

In conventional methods for manufacturing liquid crystal polymer films, even if the liquid crystal polymers are in a molten state at a certain melting temperature, the rheological properties of the liquid crystal polymers having different molecular weights may vary, and therefore it is difficult to form a liquid crystal polymer film with a uniform thickness. Therefore, in the conventional manufacturing method where the liquid crystal polymers is directly melted and processed, if an additive, such as polytetrafluoroethylene, is further added, it would be difficult to control the rheological properties of the molten liquid crystal polymers thus degrading the quality of the liquid crystal polymer film. Accordingly, it is accepted that the approach of adding an additive during the conventional manufacturing method to modify the liquid crystal polymer film is not feasible.

In some other embodiments, a dispersant may be optionally added to the mixed solution, such that the liquid crystal polymer powder and the solvent may form a more homogenous and stable dispersion, and thereby preventing aggregation of the liquid crystal polymer powder. In one example, the dispersant may be methacrylic acid phosphate (MMP), glyceryl tristearate or hydroxypropyl methylcellulose, but is not limited to.

At step S13, the mixed solution is coated on a carrier board to form a coating layer. In some embodiments, a thickness of the coating layer may range from 10 μm to 20,000 μm, such as 100 μm, 500 μm, 1,000 μm, 3,000 μm, 5,000 μm, 7,000 μm, 9,000 μm, 10,000 μm, 13,000 μm, or 15,000 μm. More specifically, the mixed solution may be uniformly coated on the carrier board through a slit, such as a spraying process. In some embodiments, the carrier board may be, for example, a steel plate, a ceramic substrate, a copper foil, and/or a metal plate, but is not limited to.

Subsequently, at step S14, heating the coating layer to a first temperature to remove the solvent in the coating layer. It is understood that the first temperature can be appropriately adjusted based on the solution type being selected (that is, adjusting and selecting the first temperature with reference to the boiling point of the solvent) to remove the solvent in the coating layer. It is noted that the liquid crystal transition temperature of the liquid crystal polymer powder being selected must be higher than the boiling point of the solvent, such that the liquid crystal polymer powder on the carrier board is uniformly distributed after the operation of removing the solvent.

At step S15, after the solvent is removed, continuously heating the liquid crystal polymer powder to a second temperature to form a liquid crystal polymer film. It is noted that when a solid-state liquid crystal polymer is heated to its glass transition temperature $(T_g)$, the internal molecular chains of the liquid crystal polymer undergo some local motions. As the temperature continues to rise from the glass transition temperature to the liquid crystal transition temperature of the liquid crystal polymer, the liquid crystal polymer undergoes a phase transition to a liquid crystal state and thus become birefringent and fluid. The orientation of the internal molecules of the liquid crystal polymer in the liquid crystal state is still the same as a crystalline structure. As the temperature continues to rise from the liquid crystal transition temperature to the melting point $(T_m)$ of the liquid crystal polymer, the liquid crystal polymer again undergoes a phase transition to an isotropic liquid state, and the internal molecules of the liquid crystal polymer are randomly and disorderly distributed, which are similar to those of a liquid. In some embodiments, the second temperature must be at least higher than the liquid crystal transition temperature of the liquid crystal polymer. For example, the second temperature may be between the liquid crystal transition temperature and the melting point $(T_m)$ of the liquid crystal polymer or higher than the melting point $(T_m)$ of the liquid crystal polymer.

In some embodiments, the liquid crystal polymer film is gradually cooled down to form the liquid crystal polymer film. In some embodiments, a thickness of the liquid crystal polymer film which is formed after cooling may have of 1 μm to 2,000 μm, such as 10 μm, 50 μm, 100 μm, 300 μm, 500 μm, 700 μm, 900 μm, 1,000 μm, 1,300 μm or 1,500 μm. In other embodiments, the formed liquid crystal polymer film is removed from the carrier board and collected into a roll.

Figure 2:
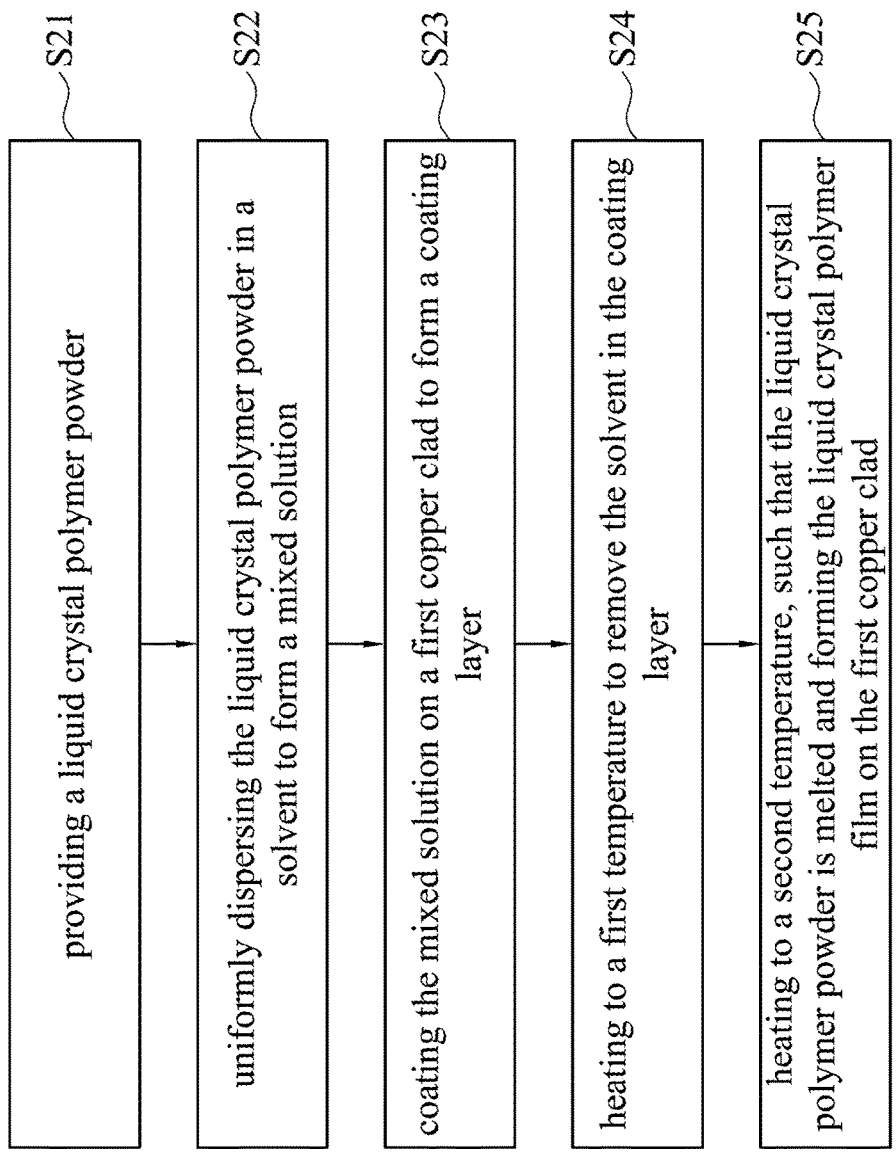
FIG. 2 illustrates a flow chart of a method of manufacturing a flexible copper clad laminate having a liquid crystal polymer film in accordance with an embodiment of the invention.

Another aspect of the invention is to provide a manufacturing method of a flexible copper clad laminate having a liquid crystal polymer film. FIG. 2 illustrates a method 20 of manufacturing a flexible copper clad laminate having a liquid crystal polymer film in accordance with an embodiment of the invention. As shown in FIG. 2, the manufacturing method 20 includes steps S21 to S25.

First, at step S21, a liquid crystal polymer powder is provided. In some embodiments, the liquid crystal polymer powder may be prepared by grinding a liquid crystal polymer, but is not limited thereto. In some embodiments, an average particle size of the liquid crystal polymer powder may range from 1 nm to 1,000 μm, such as 5 nm, 10 nm, 15 nm, 20 nm, 30 nm, 50 nm, 70 nm, 90 nm, 100 nm, 1 μm, 5 μm, 10 μm, 15 μm, 20 μm, 50 μm, 100 μm, 200 μm, 300 μm, 400 μm, 500 μm, 600 μm, 700 μm, 800 μm, or 900 μm. Specifically, It is noted that the liquid crystal polymer in the present invention is a thermotropic liquid crystal polymer resin. The thermotropic liquid crystal polymer may be classified into a liquid crystal polymer resin or a liquid crystal oligomer resin, depending on their molecular weights. In some embodiments, the liquid crystal polymer powder may be formed by grinding the liquid crystal polymer resin and/or the liquid crystal oligomer resin. In some embodiments, a commercially available liquid crystal polymer includes: 1. Type I liquid crystal polymer resin, which is high-thermal-resistant and having a liquid crystal transition temperature greater than about 330° C. Type I liquid crystal polymer resin has a high tensile strength, a high elastic modulus, an excellent chemical resistance, suitable to be used under a high temperature, but the processability is inferior. 2. Type II liquid crystal polymer resin, which has medium thermal resistance and a liquid crystal transition temperature of about 280° C. to about 320° C. Type II liquid crystal polymer resin is chemical-resistant and hydrolytic-stable, exhibits excellent electrical properties, flame retardancy, strong barrier properties, and its overall performance is better. 3. Type III liquid crystal polymer resin, which has low thermal resistance and a liquid crystal transition temperature lower than about 240° C. Type III liquid crystal polymer resin, though having a weak heat resistance, has excellent processability and is low-cost. It is noted that the liquid crystal transition temperature is a certain temperature at which the liquid crystal polymer resin undergoes a phase transition from a solid state to a liquid crystal state upon heating. It is understood that different types of the liquid crystal polymer resins may have different liquid crystal transition temperatures as their respective monomer structures are different. Examples of these three types of liquid crystal polymer resins are provided above, and therefore are not repeated herein.

Next, at step S22, the liquid crystal polymer powder is uniformly dispersed in a solvent to form a mixed solution. In some embodiments, a ratio of the liquid crystal polymer powder to the solvent (the liquid crystal polymer powder/the solvent) may range from 1/100 to 90/100, such as 10/100 to 80/100, 20/100 to 70/100, 30/100 to 60/100, or 40/100 to 50/100. It is noted that the liquid crystal polymer powder is insoluble or slightly soluble in the solvent. The liquid crystal polymer powder is well dispersed in the solvent due to their inherent properties. Specifically, the liquid crystal polymer powder is dispersed in the solvent to form a suspension and is not precipitated from the suspension. In some embodiments, the solvent may include a polar solvent or a non-polar solvent. The solvent may be, for example, an amide solvent, an acid solvent, an alcohol solvent, a ketone solvent, an aromatic solvent, or water. Examples of these solvents are provided above, and therefore are not repeated herein.

In some other embodiments, different additives may be optionally added to the mixed solution to modify a liquid crystal polymer film subsequently formed, such that the liquid crystal polymer film may possess some certain properties, and thereby meeting the requirements of applicable products. In some examples, the additives may be a stabilizer, a lubricant, a filler, a colorant, a curing agent, a plasticizer, and/or an antioxidant, but are not limited thereto. In one example, a surface-treated polytetrafluoroethylene (PTFE) may be added as an additive to enhance the electrical properties of the subsequently formed liquid crystal polymer film, and also to decrease the dielectric constant ($D_k$) and dissipation factor ($D_f$) of the subsequently formed liquid crystal polymer film.

In conventional methods for manufacturing liquid crystal polymer films, even if the liquid crystal polymers are in a molten state at a certain melting temperature, the rheological properties of the liquid crystal polymers having different molecular weights may vary, and therefore it is difficult to form a liquid crystal polymer film of a uniform thickness. Therefore, in the conventional manufacturing methods where the liquid crystal polymer powder is directly melted and processed, if an additive such as polytetrafluoroethylene is further added, it would be difficult to control the rheological properties of the molten liquid crystal polymers, thus degrading the quality of the liquid crystal polymer film. Accordingly, it is accepted that the approach of adding an additive during the conventional manufacturing method to modify the liquid crystal polymer film is not feasible.

In some other embodiments, a dispersant may be optionally added to the mixed solution, such that the liquid crystal polymer powder and the solvent may form a more homogenous and stable dispersion, and thereby preventing aggregation of the liquid crystal polymer powder. In one example, the dispersant may be methacrylic acid phosphate (MMP), glyceryl tristearate or hydroxypropyl methylcellulose, but is not limited thereto.

At step S23, the mixed solution is coated on a first copper clad to form a coating layer. In some embodiments, a thickness of the coating layer may range from 10 μm to 20,000 μm, such as 100 μm, 500 μm, 1,000 μm, 3,000 μm, 5,000 μm, 7,000 μm, 9,000 μm, 10,000 μm, 13,000 μm, or 15,000 μm. More specifically, the mixed solution may be uniformly coated on the first copper clad through a slit, such as a spraying process.

Subsequently, at step S24, heating the coating layer to a first temperature to remove the solvent in the coating layer. It is understood that the first temperature can be appropriately adjusted based on the solution type being selected (that is, adjusting and selecting the first temperature with reference to the boiling point of the solvent) to remove the solvent in the coating layer. It is noted that the liquid crystal transition temperature of the liquid crystal polymer powder being selected must be higher than the boiling point of the solvent, such that the liquid crystal polymer powder on the first copper clad is uniformly distributed after the operation of removing the solvent.

At step S25, after the solvent is removed, continuously heating the liquid crystal polymer powder to a second temperature to form a liquid crystal polymer film. It is noted that when a solid-state liquid crystal polymer is heated to its glass transition temperature ($T_g$), the internal molecular chains of the liquid crystal polymer undergo some local motions. As the temperature continues to rise from the glass transition temperature to the liquid crystal transition temperature of the liquid crystal polymer, the liquid crystal polymer undergoes a phase transition to a liquid crystal state thus become birefringent and fluid. The orientation of the internal molecules of the liquid crystal polymer in the liquid crystal state is still the same as a crystalline structure. As the temperature continues to rise from the liquid crystal transition temperature to the melting point ($T_m$) of the liquid crystal polymer, the liquid crystal polymer again undergoes a phase transition to an isotropic liquid state, and the internal molecules of the liquid crystal polymer are randomly and disorderly distributed, which are similar to those of a liquid. In some embodiments, the second temperature must be at least higher than the liquid crystal transition temperature of the liquid crystal polymer. For example, the second temperature may be between the liquid crystal transition temperature and the melting point ($T_m$) of the liquid crystal polymer or higher than the melting point ($T_m$) of the liquid crystal polymer.

In some embodiments, the liquid crystal polymer film is gradually cooled down to form the liquid crystal polymer film. In some embodiments, a thickness of the liquid crystal polymer film which is formed after cooling may range from 1 μm to 2000 μm, such as 10 μm, 50 μm, 100 μm, 300 μm, 500 μm, 700 μm, 900 μm, 1000 μm, 1300 μm or 1500 μm. Thus, a single-sided flexible copper clad laminate may be formed.

In a further embodiment, the single-sided flexible copper clad laminate is heated to a third temperature and a second copper clad is attached on the liquid crystal polymer film of the laminate, such that the liquid crystal polymer film is disposed between the first copper clad and the second copper clad. More specifically, the third temperature must be at least higher than the glass transition temperature ($T_g$) of the liquid crystal polymer. For example, the third temperature may be, between the glass transition temperature ($T_g$) and the melting point ($T_m$) of the liquid crystal polymer, or between the liquid crystal transition temperature and the melting point ($T_m$) of the liquid crystal polymer. In some embodiments, the single-sided flexible copper clad laminate is heated to a temperature above the glass transition temperature of the liquid crystal polymer, such that to the surface of the liquid crystal polymer film is softened, and therefore it is easier to attach with the second copper clad. Thus, a double-sided flexible copper clad laminate may be formed.

In a yet further embodiment, when the liquid crystal polymer film is yet to be cooled down, and the temperature is maintained at the second temperature (at least higher than the liquid crystal transition temperature of the liquid crystal polymer), the second copper clad is directly attached to the liquid crystal polymer film. Therefore, the liquid crystal polymer film is sandwiched between the first copper clad and the second copper clad. The double-sided flexible copper clad laminate may be thus formed.

Compared with a conventional polyimide (PI) film, the liquid crystal polymer film formed by the manufacturing method of the liquid crystal polymer film in the present invention has a lower water absorption, dielectric constant, dissipation factor, coefficient of thermal expansion (CTE), and excellent dimensional stability, electrical properties, gas barrier properties, thermal conductivity, and also acid, alkali and chemical resistance. Therefore, the liquid crystal polymer film is suitable to be processed and employed in packaged products, which are used for high-frequency communication, or the like. Preferably, the flexible copper clad laminates having the liquid crystal polymer film can be employed in the fields of computers and accessory devices, communication products, digital cameras, consumer electronic products, automobiles, military, and the like.

Although the present invention has been described in detail with reference to certain embodiments thereof, the foregoing is only the preferred embodiments of the present invention, and is not intended to limit the scope thereof. It will be apparent to those skilled in the art that various modifications and variations are possible without departing from the scope or spirit of the invention. Therefore, the scope of the present invention is determined by the claims that follow.

What is claimed is:

1. A method of manufacturing a liquid crystal polymer film, comprising operations of:
   providing a liquid crystal polymer powder;
   uniformly dispersing the liquid crystal polymer powder in a solvent to form a mixed solution, wherein the liquid crystal polymer powder is insoluble in the solvent;
   coating the mixed solution on a carrier board to form a coating layer;
   heating the coating layer to a first temperature to remove the solvent in the coating layer; and
   heating the liquid crystal polymer powder to a second temperature after removing the solvent to form the liquid crystal polymer film, wherein the second temperature is higher than the first temperature and a liquid crystal transition temperature of the liquid crystal polymer powder, and is between the liquid crystal transition temperature and a melting point of the liquid crystal polymer powder.

2. The method of claim 1, wherein the operation of uniformly dispersing the liquid crystal polymer powder in the solvent comprises adding a dispersant, an additive or a combination thereof into the mixed solution.

3. The method of claim 1, wherein the liquid crystal polymer powder has an average particle size ranged from 1 nm to 1,000 μm.

4. The method of claim 1, wherein the liquid crystal polymer film has a thickness ranged from 1 μm to 2,000 μm.

5. A method of manufacturing a flexible copper clad laminate having a liquid crystal polymer film, comprising operations of:
   providing a liquid crystal polymer powder;
   uniformly dispersing the liquid crystal polymer powder in a solvent to form a mixed solution, wherein the liquid crystal polymer powder is insoluble in the solvent;
   coating the mixed solution on a first copper clad to form a coating layer;
   heating the coating layer to a first temperature to remove the solvent in the coating layer; and
   heating the liquid crystal polymer powder to a second temperature after removing the solvent to form the liquid crystal polymer film on the first copper clad, wherein the second temperature is higher than the first temperature and a liquid crystal transition temperature of the liquid crystal polymer powder, and is between the liquid crystal transition temperature and a melting point of the liquid crystal polymer powder.

6. The method of claim 5, wherein after the operation of forming the liquid crystal polymer film, further comprising heating the flexible copper clad laminate to a third temperature and attaching a second copper clad on the liquid crystal polymer film, such that the liquid crystal polymer film is disposed between the first copper clad and the second copper clad.

7. The method of claim 6, wherein the third temperature is between a glass transition temperature ($T_g$) and a melting point ($T_m$) of the liquid crystal polymer powder.

8. The method of claim 5, wherein an average particle size of the liquid crystal polymer powder ranges from 1 nm to 1,000 μm.

9. The method of claim 5, wherein a thickness of the liquid crystal polymer film ranges from 1 μm to 2,000 μm.

* * * * *